US 6,432,461 B1

(12) United States Patent
Dixon

(10) Patent No.: US 6,432,461 B1
(45) Date of Patent: Aug. 13, 2002

(54) EDIBLE CAKE DECORATIONS

(75) Inventor: Derrick Stanley Dixon, Morpeth (GB)

(73) Assignee: Sugarfayre Limited, Northumberland (GB)

( * ) Notice: Subject to any disclaimer, the term of this patent is extended or adjusted under 35 U.S.C. 154(b) by 0 days.

(21) Appl. No.: 09/346,887

(22) Filed: Jul. 2, 1999

(30) Foreign Application Priority Data

Jun. 14, 1999 (GB) ............................................. 9913716

(51) Int. Cl.[7] ............................. A23G 3/00; A23P 1/10
(52) U.S. Cl. .................... 426/104; 426/383; 426/87; 426/512; 426/659; 426/660
(58) Field of Search ................. 426/383, 104, 426/87, 660, 512, 659, 572

(56) References Cited

U.S. PATENT DOCUMENTS

| 1,788,493 A | | 1/1931 | Olschewsky |
| 2,610,588 A | | 9/1952 | Seagren et al. |
| 3,949,125 A | * | 4/1976 | Roberts ........................ 428/99 |
| 3,981,656 A | * | 9/1976 | Steels et al. ................. 425/128 |
| 4,037,000 A | | 7/1977 | Burge .......................... 426/572 |
| 4,379,176 A | * | 4/1983 | Schwerwitz et al. ........ 426/613 |
| 5,017,394 A | * | 5/1991 | Macpherson et al. ....... 426/302 |
| 5,250,314 A | * | 10/1993 | Jones .......................... 426/512 |

FOREIGN PATENT DOCUMENTS

| CH | 680432 A5 | 8/1992 |
| DE | 42 29 897 A1 | 3/1999 |
| EP | 0 168 027 | 7/1985 |
| EP | 0 904 703 A2 | 3/1999 |
| FR | 1 214 530 | 1/1959 |
| FR | 2 640 473 | 12/1988 |
| FR | 2 750 012 | 6/1996 |
| FR | 2 763 794 | 5/1997 |
| FR | 2 764 169 | 6/1997 |
| GB | 1441446 | 6/1976 |
| GB | 1501484 | 2/1978 |
| GB | 2204223 | 11/1988 |
| GB | 2 204 223 A | 11/1988 |
| GB | 2 209 917 A | 6/1989 |
| GB | 2209917 | 6/1989 |
| GB | 2 257 946 | 1/1993 |
| GB | 2 271 920 A | 5/1994 |
| GB | 2271920 | 5/1994 |
| GB | 2 338 883 A | 1/2000 |
| LU | 33 563 | 5/1955 |

OTHER PUBLICATIONS

Patent Abstracts of Japan, Publication No. 02097357, Publication date Apr. 9, 1990, "Transfer Film for Food".

* cited by examiner

*Primary Examiner*—Milton I. Cano
*Assistant Examiner*—Robert Madsen
(74) *Attorney, Agent, or Firm*—Barlow, Josephs & Holmes

(57) ABSTRACT

An edible cake decoration comprising a sugarpaste formulation including at least one humectant. A method of forming the decoration is also disclosed which includes exposing the sugarpaste to a humid environment. An apparatus for use in the method is also disclosed which comprises a blister (6) having a profiled surface and a plurality of ventilation holes (8) therein, which blister (6) forms a template for use in the vacuum forming of the wet sugarpaste to provide a 3-D shape to the decoration, the sugarpaste being dried after vacuum forming.

12 Claims, 3 Drawing Sheets

EDIBLE CAKE DECORATIONS

The present invention relates to edible cake decorations.

BACKGROUND OF THE INVENTION

Decorations are placed on the surface of cakes to indicate a particular occasion for example a decoration in the form of holly or a Christmas tree to signify Christmas.

Traditionally such decorations are made of plastics, paper or plaster and must be removed before the cake is consumed.

It is known to replace the imitation decorations with edible decorations formed from marzipan. However marzipan decorations are hand made and as such costly to produce, furthermore marzipan contains nuts which may cause serious allergy problems with a minority of consumers.

In order to overcome these problems decorations have been made from sugarpaste. A traditional recipe for sugarpaste comprises:

| Icing sugar | 80.26% |
| --- | --- |
| Water | 6.57% |
| Glucose (dry) | 5.62% |
| Hard peanut kernel oil | 5.62% |
| Gelatine | 1.61% |
| Hyfoama | 0.32% |
| | 100% |

The known sugarpaste has a relatively high water content making it difficult to mould into a required shape not only because of its consistency, but because as the paste is handled it dries causing cracking of the decoration. Furthermore as the thickness of the paste varies across the profile of the decorations, different areas of the paste will dry at different rates, further increasing the incidence of cracking. Also, because of the relatively high water content the decorations cannot readily hold a required shape, this problem is further exasperated if the decoration is applied to a freshly iced (flooded) cake because the sugar in the decoration draws further water into the structure of the decoration from the wet icing. The cracking of the decoration as it dries leads to a reduction in the shelf-life thereof. It is also difficult to add colour to the decoration, because the water based food dies are adsorbed into the structure further leading to the dissolution of its shape and thereby to non-uniform colouring and pattern on the surface of the decoration. For this reason the sugarpaste decoration is prepared in a dry atmosphere at a temperature of 50–60° in order to prevent additional moisture entering its structure.

Because of the above drawbacks the known sugarpaste is restricted to the formation of single dimensional items of simple shape that is flat plaques. Furthermore, even in single-dimensional form the sugarpaste lacks flexibility once dry and therefore cannot be applied to and adhere to uneven surfaces; therefore cannot be bent around the edges of a cake, without breaking. Decorations made of sugarpaste also contain nuts which may cause serious allergy problems with a minority of consumers. The sugarpaste is also stiffened by gelatine making it unsuitable for vegetarians.

SUMMARY AND GENERAL DESCRIPTION OF THIS INVENTION

It is an object of the present invention to overcome or alleviate the above described drawbacks.

It is a further object to provide a sugarpaste which is flexible and can be readily formed into the required shape and which retains that shape when applied to an item to be decorated.

It is yet a further object of the present invention to provide a sugarpaste that has a long shelf-life, long term flexibility and is stable in holding colours.

In accordance with one aspect of the present invention there is provided an edible decoration comprising a sugarpaste formulation including at least one humectant.

The humectant increases the flexibility of the decoration and makes it softer and moister than standard sugarpaste, it also helps preserve the water content. This reduces the incidence of cracking as the decoration dries and allows it to be shaped to fit around an item to be decorated without degradation of its pattern/colouring.

Preferably, the sugarpaste also contains at least one gum. This further enhances the flexibility of the decoration. The action of the gum not only aids flexibility but also attracts 'free' moisture in the humidification chamber. Preferably the gum is at least one of the group emulsifiers and vegetable glycerine.

In a preferred embodiment the sugarpaste comprises 16 to 23% by weight humectant. Preferably the humectant is 19.5% by weight of the sugarpaste formulation. Preferably the humectants comprise at least one of the group glucose syrup, invert sugar, emulsifier (E414 Acacia Gum, E471 glycerine monosterate and E415 Xanthan Gum) and vegetable glycerine, Preferably the remainder of the sugarpaste comprises icing sugar, hydrogenated vegetable oil and water, this has the advantage that the sugarpaste is suitable for vegetarians and is nut-free. In a preferred embodiment the decoration contains substantially 2.27% by weight water; the presence of the humectant and/or gum preserves the flexibility of the product without the necessity for too much water within the sugarpaste, there is therefore less water in the sugarpaste when compared to the previously known sugarpaste because less water is required to mix the ingredients. The lower level of water minimises leaching of colour and assists in maintaining flexibility.

In accordance with a second aspect of the present invention a method of manufacture of 3-D edible decoration is provided comprising mixing ingredients to form a sugarpaste, the ingredients comprising at least one humectant, and then exposing the sugarpaste to a humid environment.

This has the advantage that the humectant absorbs moisture from the humid environment and this preserves the moisture content of the sugarpaste preventing it drying out too quickly.

Preferably, the humid atmosphere is at ambient temperature. In a preferred embodiment the temperature of the environment is 18° C. to 23° C. and the relative humidity is 55 to 80%. Preferably the sugarpaste is left in the humid environment for at least 6 hours.

Preferably the sugarpaste is printed with the required colours and patterns before it is exposed to the humid environment. This has the advantage that the colour/pattern is allowed to fix before additional moisture is added. Preferably the printing is carried out by a method of silk-screen printing in which the position of the applied colours and pattern has been determined from a scanned single dimensional image of the required 3-D decoration which has been cross-referenced to a second image of a finished 3-D decoration in order to determine the position of the patterns and colours on the sugarpaste.

Preferably after the sugarpaste has absorbed moisture from the humid environment it is vacuum formed to provide the 3-D shape for the decoration. The moisture and humectant within the sugarpaste allow the sugarpaste to be moulded to the required shape without loss of integrity and deformation of the pattern.

Preferably, after vacuum forming the periphery of the sugarpaste is trimmed and the sugarpaste is allowed to dry. Preferably the trimming is automated and the cutter used to trim has been profiled by computer with the outline of the required decoration.

In accordance with a third aspect of the invention there is provided a blister for use in the method of manufacture of the edible decoration, the blister having a profiled surface which forms a template for the vacuum forming process and having a plurality of ventilation holes therein. This has the advantage of forming a surface against which the sugarpaste can be drawn during the vacuum forming process. Also, the ventilation holes ventilate the blister in order to allow the vacuum to operate effectively and helps create sufficient draw to form the shape of the decoration whilst allowing the colours and pattern on the sugarpaste to locate to the correct area of the decoration. Also, the sugarpaste is drawn into the ventilation holes during vacuum forming which help maintain the position of the decoration during forming.

Preferably, the blister has a higher concentration of ventilation holes in the vicinity of a raised feature of the finished decoration. This helps draw the sugarpaste over a raised area of the blister.

In a preferred embodiment, the blisters are formed in a plastics sheet. This has the advantage that the sheet can be used as a tray for the transportation and packaging of the decorations.

Preferably, the number and concentration of the ventilation holes cut in the blister is predetermined from a scanned image of the required 3-D decoration.

BRIEF DESCRIPTION OF THE DRAWINGS

By way of example only specific embodiments of the invention will now be described with reference to the accompanying drawings in which.

DETAILED DESCRIPTION

Figure 1:
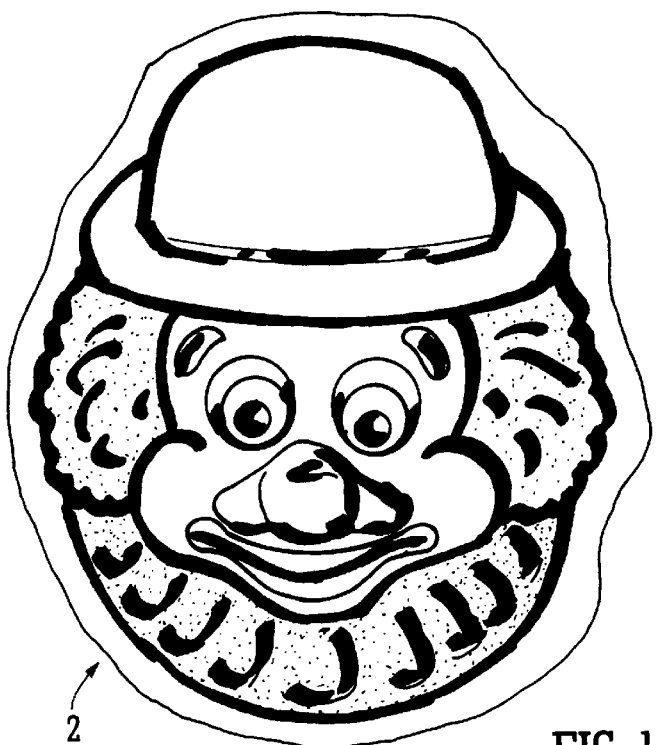
FIG. 1 is a schematic view of a 3-dimensional sugarpaste decoration constructed in accordance with one embodiment of the present invention.
Figure 4:
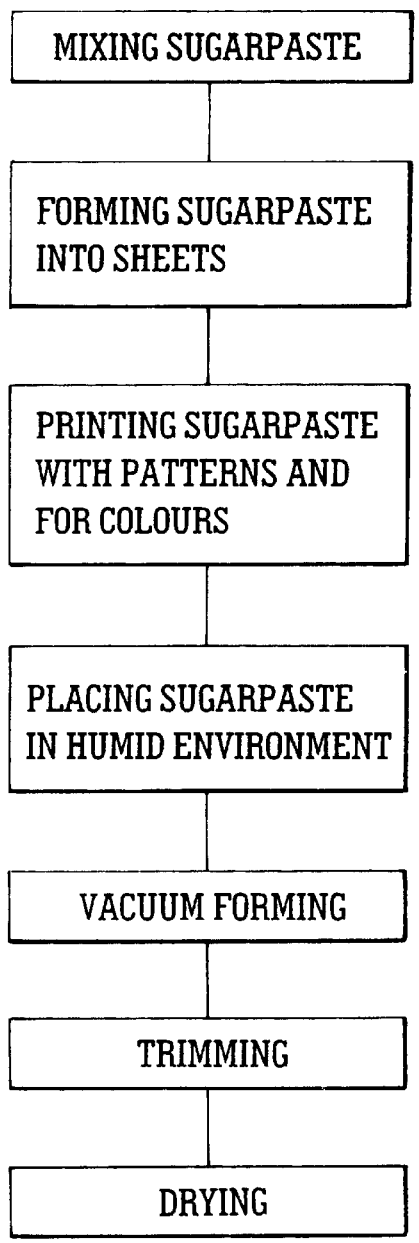
FIG. 4 is a block diagram illustrating the steps in forming a sugarpaste decoration.

Referring to FIGS. 1 and 4, the edible decoration 2 having a 3-D profile is manufactured as follows:

Firstly a sugarpaste is mixed having the formulation:

| Icing sugar | 74.24% | |
| --- | --- | --- |
| Glucose (syrup) | 12.98% | H |
| Hydrogenated vegetable oil | 3.99% | |
| Invert sugar | 2.50% | H |

-continued

| Water | 2.27% | |
| --- | --- | --- |
| Emulsifiers E414, E471, E415 | 3.02% | H |
| Vegetable glycerine | 1.00% | H |
| | 100% | |

The ingredients identified by the letter H are humectants.

The sugarpaste is then rolled into a sheet to the required thickness for the finished 3-D decoration and is placed on a tray. Colour/pattern is applied to the sheet by silk screen printing, which is described further herein after. The tray is placed on a trolley, 60 such trays could be placed on one trolley and the trolley is placed in a humidification chamber at an environment of 18 to 25° C. and 55 to 80% relative humidity for approximately 6 hours in order for the sugarpaste to absorb further moisture. The hygroscopic nature of the humectants in the sugarpaste preserve the moisture content and prevents it from drying out and thereby cracking during the subsequent stages in the production process.

Figure 3:
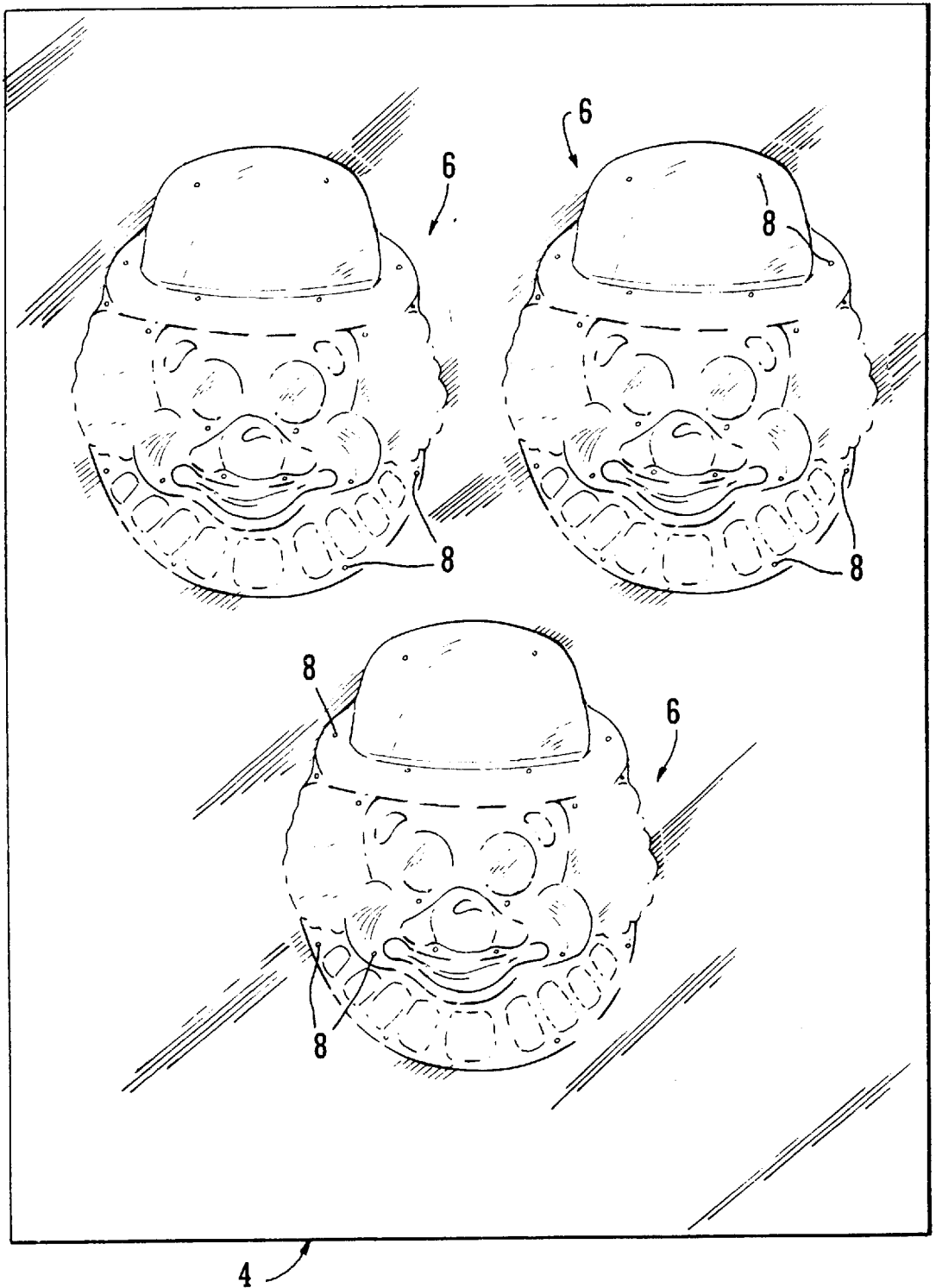
FIG. 3 is a schematic view of a plurality of blisters as illustrated in FIG. 2, formed in a plastics sheet.

The trolley is then removed from the humidification chamber and a tray is lifted from the trolley, and the sheet of coloured sugarpaste is removed. The sheet is then placed onto a registration pad. After registration, a suction lip lifts the sheet of coloured sugarpaste and is designed such that it can lift the sheet without relative lateral movement there between. The lip transports the sheet of coloured sugarpaste over the top of a sheet of plastics 4 (as best illustrated in FIG. 3). The sheet of plastics comprises a plurality of preformed blisters or moulds 6 each of which provides a template for a finished decoration. Each of the blisters 6 has a plurality of predetermined ventilation holes 8. The suction force is released and the sheet of sugarpaste is deposited on the plastics sheet 4.

The sheet 4 is then placed in a vacuum forming machine, wherein a vacuum is created at the side of the plastics sheet 4 remote from the sheet of sugarpaste thereby the sugarpaste is drawn around the raised blisters 6, the sugarpaste moulding to the profile of the blister to form the 3-D decoration. The ventilation holes 8 ventilate the blister 6 in order to allow the vacuum to operate effectively and to create sufficient draw to form the shape and still hold the colour at the required locations in the finished decoration. The number and position of those holes is determined in a method described hereinafter to ensure that sufficient sugarpaste is drawn through the blister but not too much that it causes cracking of the sugarpaste. The presence of sugarpaste within the ventilation holes forms a connection between the sugarpaste and plastics sheet 4 which lightly holds the sugarpaste in place.

The sugarpaste is then cut about the periphery of each blister 6 in order to separate the decorations 2 and the waste sugarpaste between the blisters is removed. The plastics sheet with the decoration thereon is then placed in a drying room for approximately 4 days for the added moisture to evaporate and the water content of the sugarpaste to return to substantially that of the original mix before the humidification process. The sugarpaste decorations are then ready for shipping which can take place on the plastics sheet 4 or the decorations can be individually vacuum packed.

Although the decorations can be dried at room temperature, they could be placed in a proving oven to accelerate their drying before despatch.

The process of translating a single dimensional concept through to a formed sugarpaste 3-D decoration is as follows:

The single dimensional artwork is assessed regarding its suitability of transforming that artwork into a 3-D decoration. A clay model is then prepared incorporating the necessary characterisation, depth perspective, potential colouration etc, aimed at achieving the best possible result from the original single dimension artwork. The model is then covered in a rubberised solution to form a rubber master which is used to form a metal master using a metalised resin material. In a specially adapted forming machine plain sugarpaste is formed over the metal master. Once dry the sugarpaste model is removed from the metal master and assessed for degree of detail, characterisation and overall appearance. If the product is not satisfactory the metal is modified and a further model created.

When the metal master is finally approved, the metal master is mounted on a mounted profile board with target reference to the position it will appear on the final blister profile, cutting profile, printing area and cutting profile.

The mounted profile board is accurately marked with target registration symbols and the vacuum ventilation holes are drilled around the periphery of the blister area.

The target registered profile master is then accurately positioned and the number of impressions plotted and set upon a master blister profile. Sugarpaste is drawn over the master blister profile and the individual 3-D decorations are cut. When dry the artist paints/airbrushes/colours by hand to simulate the final finished appearance of the decoration.

If the decoration is approved the master blister profile is used to manufacture the blister forming tools and the vacuum forming tools. Additionally the profile from the master blister profile is scanned into the computer and a detailed location drawing is generated which is used to make the master cutting profile tools which Cut out the decorations profile after forming. The computer is also programmed to calculate the size, position and distribution of the ventilation holes in the final blister and to control their placement within the blister profile. For this purpose the computer generated profile determines the exact location for a roller cutter which pierces the holes in the plastics sheet at an exact location to give the ventilation surface. The artist scans into the computer the original single dimensional artwork and it is cross referenced against the master blister profile and the master cutting profile and produces the disc with the necessary instructions for processing for the Repro Studio.

As mentioned above the plastic sheets containing the blisters and vacuum forming moulds are manufactured to the master blister profile, and the cutting tools are manufactured to the master cutting profile. The Repro Studio scans in the disc and produces several positives which are exposed onto printing screens for the silk screen printing process in order to accurately locate the printing/colours onto the sheet of sugarpaste at the correct positions for the final formed product. Full colour test prints are carried out for conformity registration, overall appearance, draw characteristics. If approved the process is handed over to production.

Figure 2:
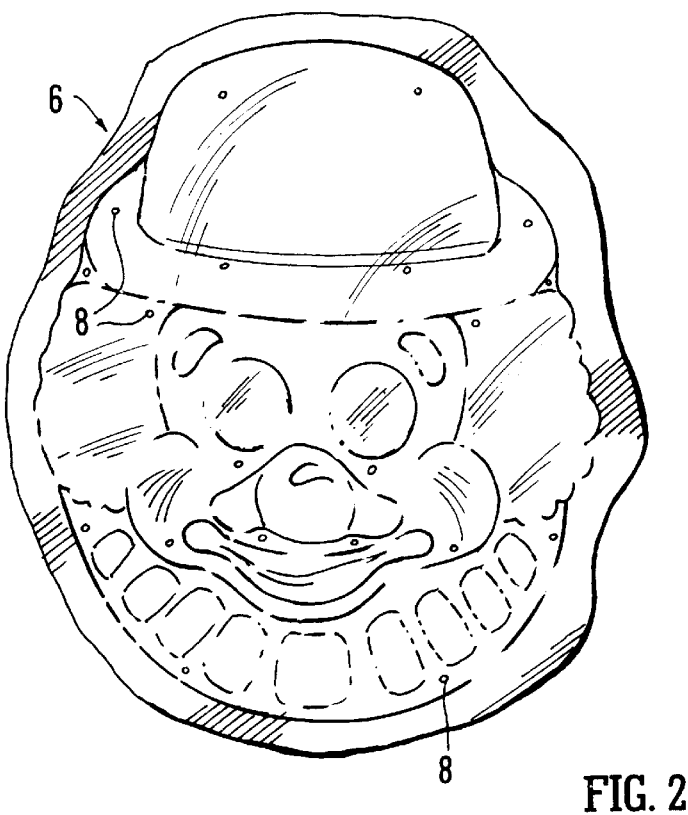
FIG. 2 is a schematic view of a blister used for the formation of the profile of the decoration of FIG. 1 and for its vacuum packaging.

The number and distribution of ventilation holes are calculated based on the actual profile of the decoration in order to maintain the colour/pattern in the area of a raised portion. For example in the 3-D decoration shown in FIG. 1, the nose and cheeks of the clown's face are raised, this leads to a higher concentration of ventilation holes in this area (see FIG. 2). Likewise the hat rim and eyebrows are raised, also leading to ventilation holes in these particular areas.

Figure 5:
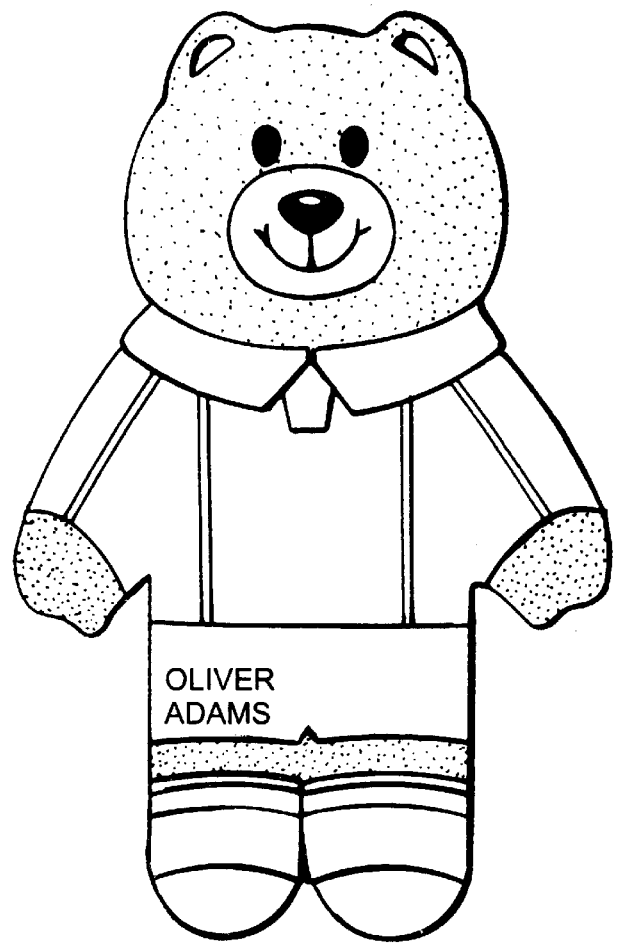
FIG. 5 is a schematic view of a flat sugarpaste decoration constructed in accordance with a second embodiment of the present invention.

Although 3-D decorations have been described the sugarpaste could also be used to produce 2-D and 1-D decorations as best illustrated in FIG. 5. For this the sheet of sugarpaste is rolled to the correct thickness and the required pattern/colours printed thereon. The decorations can then be stamped out of the sugarpaste sheet.

A flat-plaque produced in the above fashion was tested for flexibility as follows:

The printed/profile cut piece of sugarpaste was wrapped around a 50 mm rolling pin and left in an ambient environment. After 6 days the sugarpaste had retained its shape, that is it had not relaxed and returned to its original flat state. When removed from the rolling pin, the sugarpaste retained its annular shape. The sugarpaste had not cracked, nor had the printing distorted.

It is to be understood the aforementioned described configurations are illustrative of the application of the principles of the invention. Similar formulations and processing techniques could be devised by those skilled in the art without departing from the spirit and scope of the invention.

Although a specific formulation for sugarpaste has been described, different ingredients and/or quantities could be used provided that the paste comprises a relatively high level of humectants. The moisture preserving nature of the humectants preserve the moisture content of the sugarpaste and thereby prevent it cracking. In the given example, the humectants amount to 19.5% by weight, however humectant content of 16 to 23% by weight achieve goods results. Also, the humectants provide for a soft, moist and flexible product.

Also, the sugarpaste formulation comprises a number of gums, this improves the flexibility of the sugarpaste, also improving the draw characteristics and reducing the incidence of cracking. In the given formulation the emulsifiers and the vegetable glycerine are gums, but other gums may be used and percentage by weight could be used for example 2 to 4% by weight.

The given formulation is suitable for both vegetarians and people susceptible to nut allergies. However, if the product did not have to be nut free, marzipan could be added to the sugarpaste to further increase its flexibility.

The invention has been described with reference to specific and preferred embodiments, it will be appreciated that further and various modifications may be made without departing from the spirit and scope of the invention.

I claim:

1. A decoration comprising:
   a sugar paste formulation that is vacuum molded into a three-dimensional decorative shape having raised portions, said sugar paste formulation including
      icing sugar,
      hydrogenated vegetable oil,
      water,
      a humectant that is present in said sugar paste formulation in an amount between about 19% to about 23% by weight, said humectant being selected from the group consisting essentially of: glucose syrup, invert sugar, acadia gum, glycerol monosterate, xantham gum, vegetable glycerin, and mixtures thereof;
   said sugar paste formulation being accurately decorated with colored dye, being exposed to a controlled humid environment for a time sufficient to absorb moisture to allow vacuum molding into said three-dimensional decorative shape having raised portions,
   said decoration being edible.

2. A method of making a three-dimensional decoration comprising the steps of:
   mixing a sugar paste formulation including at least one humectant, wherein said humectant is present in said sugar paste formulation in an amount between about 16% and about 23% by weight;

exposing said mixed sugar paste formulation to a controlled humid environment for a predetermined period of time sufficient for said mixed sugar paste formulation to absorb a predetermined quantity of water; and vacuum forming said exposed sugar paste formulation into a three dimensional shape having raised portions, after absorbing moisture from said controlled humid environment.

3. The method of claim 2 wherein said controlled humid environment is at ambient room temperature.

4. The method of claim 2 wherein said controlled humid environment is at a temperature of between about 18° C. to about 23° C. and the relative humidity is between about 55% to about 80%.

5. The method of claim 2 wherein said sugar paste formulation is exposed to said controlled humid environment for at least 6 hours.

6. The method of claim 2 further comprising the steps of trimming a peripheral edge of the decorative shape and drying said decorative shape.

7. The method of claim 2 further comprising the step of accurately coloring the sugar paste formulation before it is exposed to said humid environment.

8. The method of claim 7 wherein said step of coloring is carried out by screen printing coloring onto the sugar paste formulation.

9. The method of claim 7 wherein said vacuum forming is carried out using a blister form having a three-dimensional profiled surface that forms a template for shaping said decoration during said vacuum forming process, said blister having a plurality of ventilation holes located in a deliberate manner so as to maintain the position of said coloring on said decoration.

10. The method of claim 9 wherein said blister has a higher concentration of ventilation holes in the vicinity of a raised feature of the decorative shape.

11. The method of claim 10 wherein a plurality of said blisters are formed in a single plastic sheet and a plurality of said decorations are formed in a single vacuum forming process.

12. A method of making a three-dimensional decoration, comprising the steps of:

providing a blister form, said blister form having a three-dimensional profiled surface that forms a template having raised areas defining the three-dimensional features of said decoration for shaping said decoration and said blister having a plurality of ventilation holes;

mixing a sugar paste formulation including at least one humectant, wherein said humectant is present in said sugar paste formulation in an amount between about 16% and about 23% by weight;

coloring said mixed sugar paste formulation using colored dyes, each area of said colored dye corresponding to said raised areas of said blister;

exposing said mixed sugar paste formulation to a controlled hum id environment for a predetermined period of time sufficient for said mixed sugar paste formulation to absorb a predetermined quantity of water; and vacuum forming said ex posed sugar paste formulation in to a three dimensional shape having raised portions using said blister form, said blister having a plurality of ventilation holes located in a deliberate manner so as to maintain the position of said areas of said colored dyes relative to said corresponding raised areas on said decoration.

* * * * *